United States Patent [19]
Davidson

[11] Patent Number: 5,791,788
[45] Date of Patent: Aug. 11, 1998

[54] BEARING ASSEMBLY FOR ROTATING AXLES

[75] Inventor: Kyle Davidson, 17 Bennett Rd., Poughkeepsie, N.Y. 12601

[73] Assignee: Kyle Davidson, Poughkeepsie, N.Y.

[21] Appl. No.: 931,270

[22] Filed: Sep. 15, 1997

[51] Int. Cl.$^6$ ............................................. F16C 19/10
[52] U.S. Cl. ............................................. 384/612
[58] Field of Search ............................. 384/612, 616, 384/617, 620, 495

[56] References Cited

U.S. PATENT DOCUMENTS

| | | |
|---|---|---|
| 963,609 | 7/1910 | Mascord . |
| 3,749,454 | 7/1973 | Bailey et al. ............... 384/24 |
| 3,937,035 | 2/1976 | Fisher et al. .............. 384/585 |
| 5,060,750 | 10/1991 | Klages ....................... 384/903 |
| 5,211,273 | 5/1993 | Castens . |

Primary Examiner—Lenard A. Footland
Attorney, Agent, or Firm—Louis Weinstein

[57] ABSTRACT

A bearing assembly for a driving axle of karts having a tubular housing pivotally supported by a trunnion assembly about a pivot axis which is perpendicular to and lies in a common plane with a longitudinal axis of the tubular housing. Ball bearing assemblies for taking up radial thrust are arranged on opposite sides of the pivot axis and free-wheelingly support a driving axle whose axis of rotation is perpendicular to the pivot axis of the tubular housing. A thrust bearing and thrust washer are arranged between a radial bearing and a support shoulder of the tubular housing provided between the pivot axis and an outboard side of the tubular housing. The trunnion assembly is designed to bring the pivot axis into horizontal alignment. An axial thrust bearing and thrust washer can be provided at both ends of the tubular housing and on opposite sides of the pivot axis. The aforesaid bearing assemblies significantly reduce or eliminate slowdown of the kart due to "chassis bind".

22 Claims, 7 Drawing Sheets

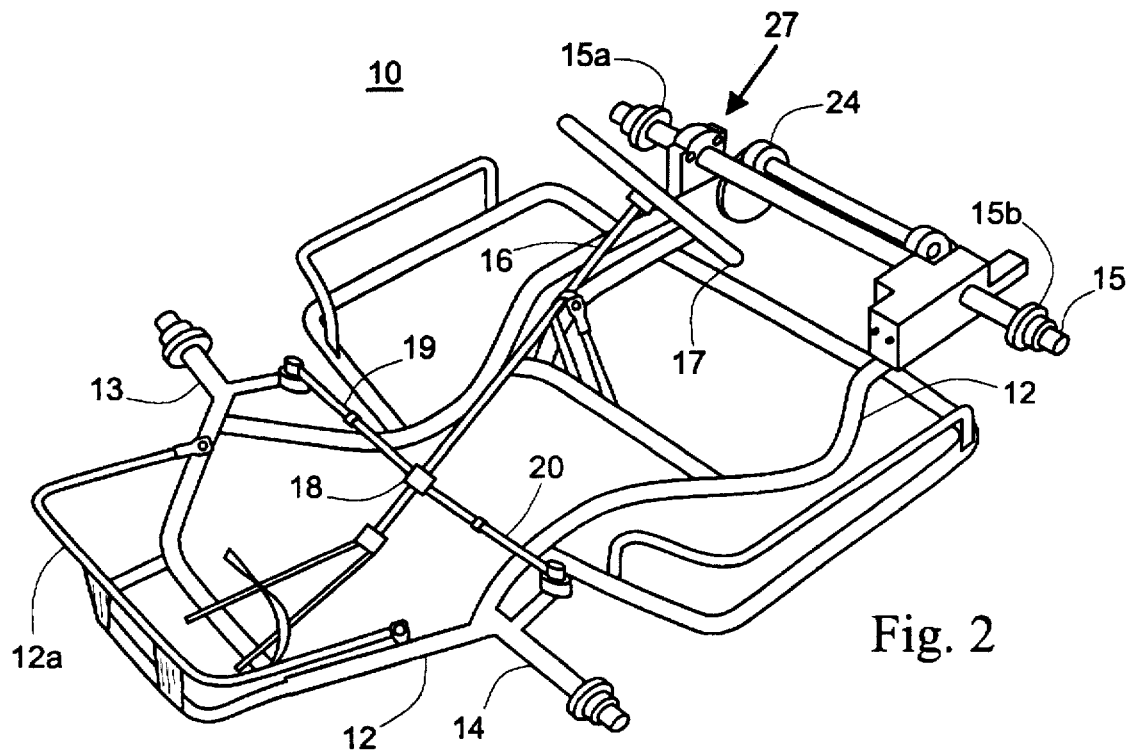
Fig. 2
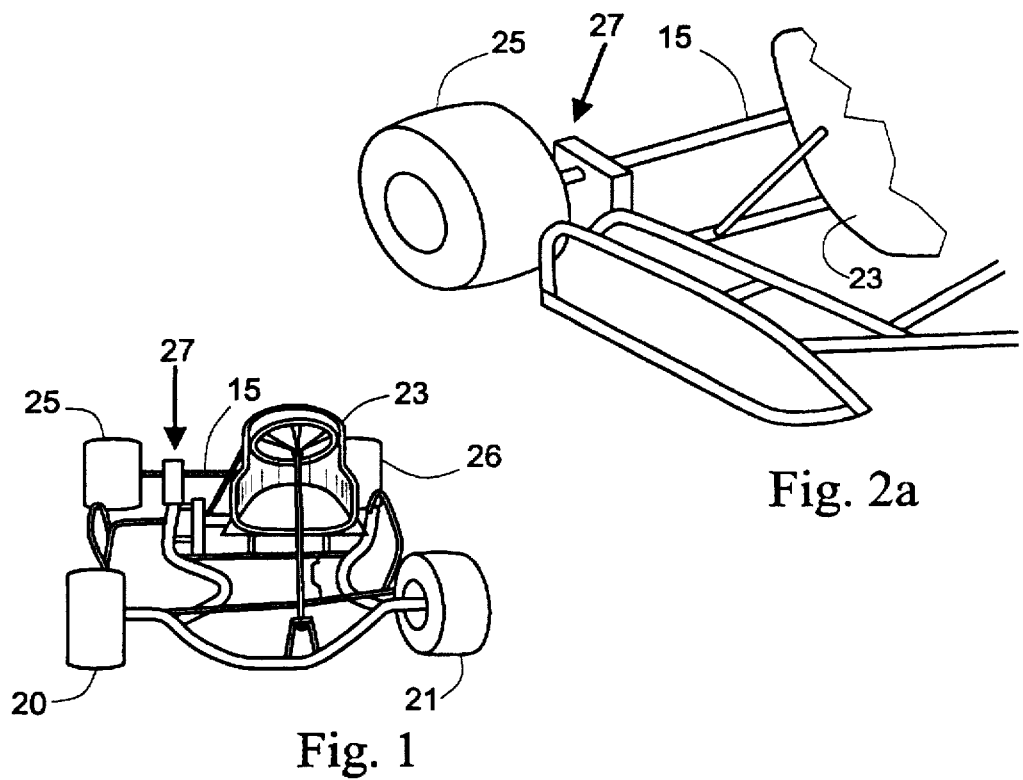
Fig. 2a
Fig. 1

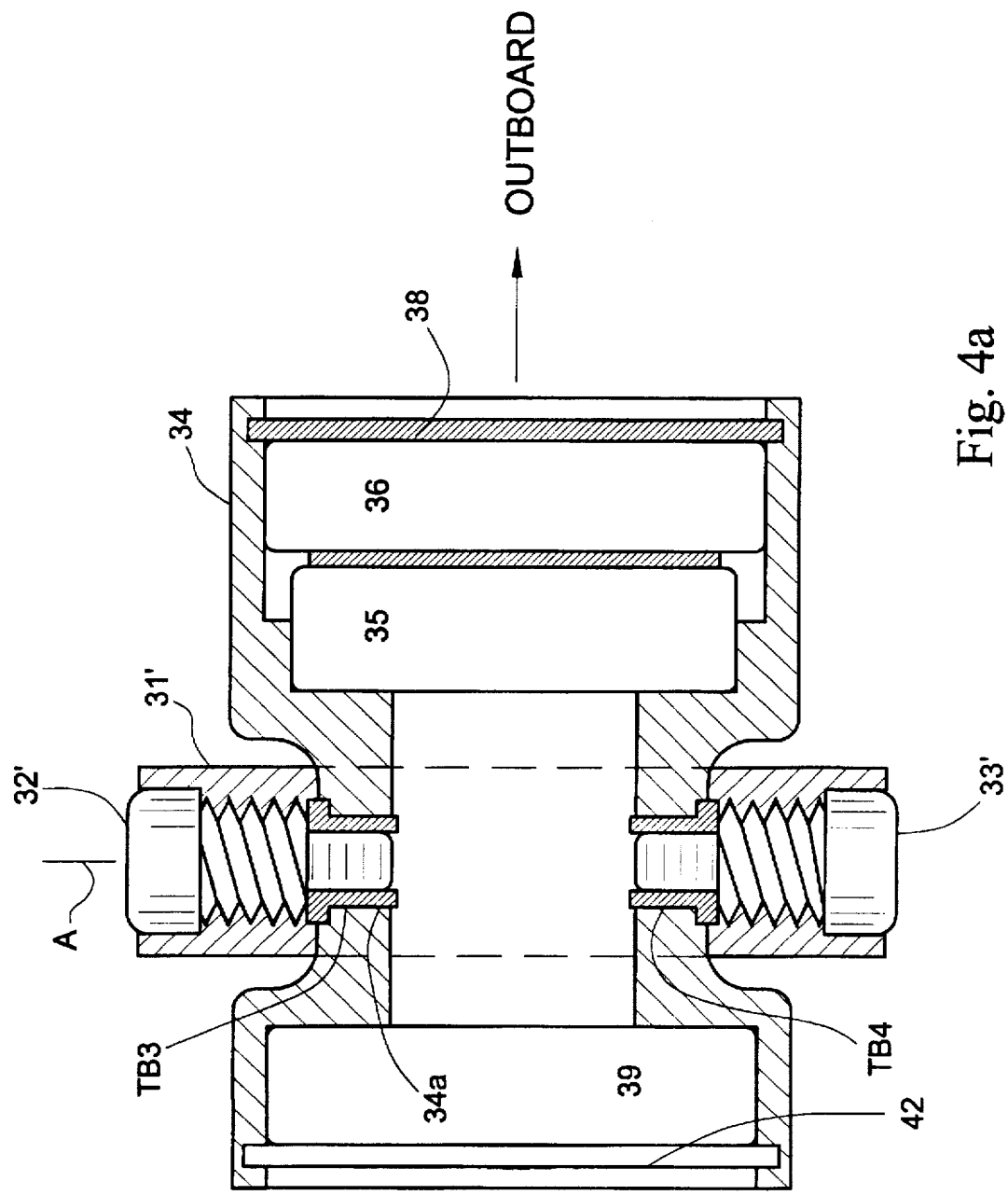

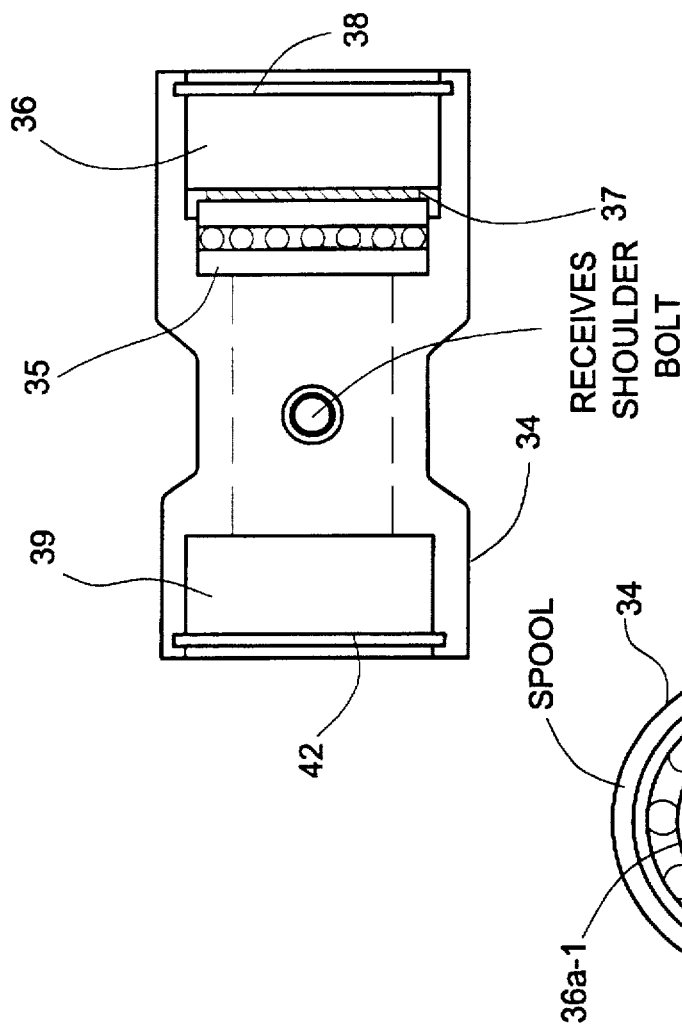
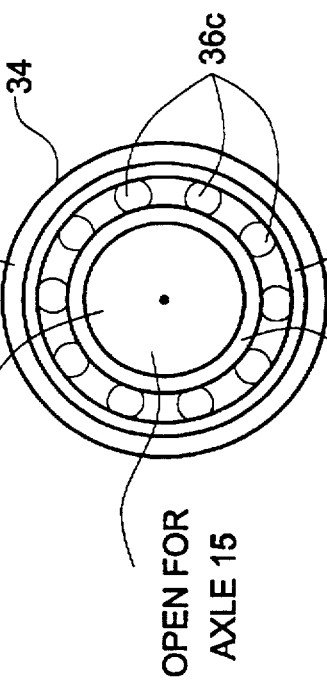
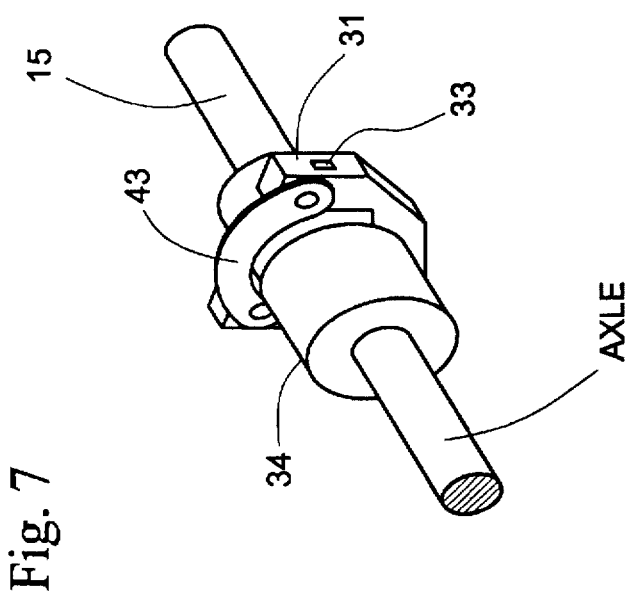

BEARING ASSEMBLY FOR ROTATING AXLES

FIELD OF THE INVENTION

The present invention relates to bearings especially adapted for karts and the like, and more particularly to a novel bearing design which locates the axle, takes up radial and axial loads, transfers torque to the chassis, and stabilizes the axle, all of which assures free rotation of the axle even in the presence of chassis deflection.

BACKGROUND OF THE INVENTION

The present invention relates to bearings for supporting a rotatable axle and is especially adapted for use with small, lightweight karts.

Karts of this nature typically comprise an engine mounted adjacently to a single seat and positioned just forward of the rear axle of the kart. A pair of drive wheels are fixed to opposite ends of the axle. Such karts further include a centrifugal clutch selectively coupling the engine to the axle wherein the engine is drivingly connected to the axle at relatively high speeds and, is disengaged from the axle at lower speeds.

Karts of this nature are primarily used for racing. In racing, it is key that bearings operate at peak efficiency in order to obtain maximum speed and performance. Ball bearings have a maximum capacity for radial and axial loading. Therefore, the more axial load increases, the less efficient the bearing becomes at providing anti-friction for radial loads and vice versa. The present invention provides a means of separating these two loads and providing a separate means of anti-friction for each load type, in one integral unit. Additionally, bearing application in present day karts causes the spherical outer case ball bearings to be mounted by means of some encasement such as flangettes or pillow blocks which have radii similar to the bearing. When a kart chassis deflects, the rear axle is caused to angularly displace from its static centroid axis. This angular displacement causes the ball bearing to slide rotationally in its housing which has a similar spherical inner bore. This ball joint movement causes additional friction at the axle's bearing. The speed spool of the present invention, to be described in detail, provides an anti-frictional point of chassis attachment with a trunnion type mount which allows the spool to function independent of chassis deflection.

The spherical outer diameter, single row axle bearings presently in use are not able to accommodate all of the loads and functions imposed on the bearings and still operate efficiently. This causes slowing of the kart in turns due to the fact that the bearing is overloaded.

Videos taken of karts in operation and especially negotiating tight turns have been found to identify the maximum slowing as taking place over a short distance just after the apex of the turn (on a level track). It is difficult for drivers to detect that they are experiencing such slowdown, typically referred to as "chassis bind" since all karts fitted with conventional bearings perform the same way. However, such slowing is obvious with a kart fitted with conventional bearings which also has a poor chassis set-up.

It is thus advantageous to provide means for overcoming the problems and disadvantages of present day karts.

BRIEF DESCRIPTION OF THE INVENTION

The present invention provides a novel bearing assembly which overcomes "chassis bind" and which is characterized by comprising a tubular housing fitted with radial ball bearings at opposite ends which are provided to take up radial loads and stabilize the axle. An axial thrust bearing is positioned inboard of the outboard ball bearing and is fitted against an internal shoulder provided within the tubular housing.

The tubular housing has an intermediate portion thereof along the exterior surface which is of reduced diameter relative to the remainder of the outer periphery. The housing is mounted in a trunnion fashion to a yoke member by means of two coaxially aligned shoulder bolts or pins, the coaxial axis being horizontally aligned. The yoke is bolted to a bearing hanger provided as part of the chassis. The shoulder bolts, when bottomed out against internal shoulders provided within the yoke, in one embodiment, automatically align the trunnion pivot axis with the longitudinal rotational axis of the axle, enabling the spool to rotate in the Y axis during flexing of the chassis.

When the spool is mounted in the yoke by means of two pins, the two pins are pressed through the yoke until the inner ends of the pins extend into two co-axially aligned flanged bushings which are pressed into the spool 180° opposed. A press-fit is provided between the yoke and the pins to retain the pins within the flanged bushings. Also the relationship of the trunnion pivot and the longitudinal axis of the axle can be offset vertically to further affect lateral and vertical loading of the axle. Placing the pivot axis above the centerline of the axle puts more vertical loading on the outboard tire and reduces loading of the inboard tire. Aligning the pivot axis below the axle centerline has the reverse effect. To provide for such selective loading, the tubular housing may be provided with three sets of openings (above, below and aligned with the centerline of the axle). The trunnion allows the bearings in the tubular axle housing to operate independent of chassis movement, thereby assuring free rotation.

In a tight turn, although the chassis moves in the outboard direction urging a locking collar provided on the axle against the outboard end of the outboard bearing, the axle thrust bearing is provided to take up such lateral loads.

The yoke, which is open at one end to facilitate assembly and disassembly thereof from the axle, may be provided with a safety bail secured to the yoke by fastening members which serve the dual functions of securing the bail to the yoke as well as joining the yoke to the bearing hanger provided on the chassis.

In an alternative embodiment, the bearing assembly may be provided with axial thrust bearings at both ends, each being located inboard of its associated radial bearing enabling the bearing assembly to prevent the occurrence of "chassis bind" in karts driven through both right and left turns as opposed to oval tracks which turn in only one direction (typically left only).

The bearing assembly thus automatically locates the axle and aligns the axle with the bearing pivot axis, takes up radial and axial loads, transfers torque to the chassis, stabilizes the axle which serves to dampen axle flex and minimize loss of contact patch (i.e., traction) and assures that the axle is free to rotate even in the presence of chassis deflection.

OBJECTS OF THE INVENTION

It is therefore one object of the present invention to provide a novel bearing assembly for supporting axles and the like and having the capability of taking up axial and radial loads.

Still another object of the present invention is to provide a novel bearing assembly having a trunnion mount which automatically aligns the trunnion pivot axis with the longitudinal rotational axis of the axle.

Still another object of the present invention is to provide a bearing assembly capable of taking up radial and axial loads in both directions.

Still another object of the present invention is to provide a novel bearing assembly for an axle which transfers torque to the chassis being driven by the axle.

Still another object of the present invention is to provide a novel bearing assembly for drive axles and the like and which is designed to stabilize the axle thereby dampening axle flex and minimizing loss of traction.

Still another object of the present invention is to provide a novel bearing assembly for axles and the like which assure free rotation of the axle even in the presence of chassis deflection.

BRIEF DESCRIPTION OF THE FIGURES

The above as well as other objects of the present invention will become apparent when reading the accompanying description and drawings in which:

FIG. 1 is a perspective view of a kart which may use the bearing assembly of the present invention to great advantage.

FIG. 2 is another perspective view of the kart of FIG. 1 with some of the parts removed to facilitate a better understanding of the axle assembly.

FIG. 2a is still another perspective view showing a rear portion of the kart of FIG. 1.

FIG. 4a shows a sectional view of an alternative arrangement to that shown in FIG. 4.

FIG. 5 is a schematic elevational view of the bearing assembly of the present invention looking in the direction of arrows 5—5 of FIG. 3.

FIG. 6 shows an end view of one of the radial ball bearings employed in the bearing assembly of FIG. 4.

FIG. 7 is a perspective view of the bearing assembly of the present invention mounted upon an axle.

FIG. 9 is a sectional view of the second embodiment of the present invention looking in the direction of arrows 9—9 of FIG. 8.

DETAILED DESCRIPTION OF THE INVENTION AND THE PREFERRED EMBODIMENTS THEREOF

Figure 3:
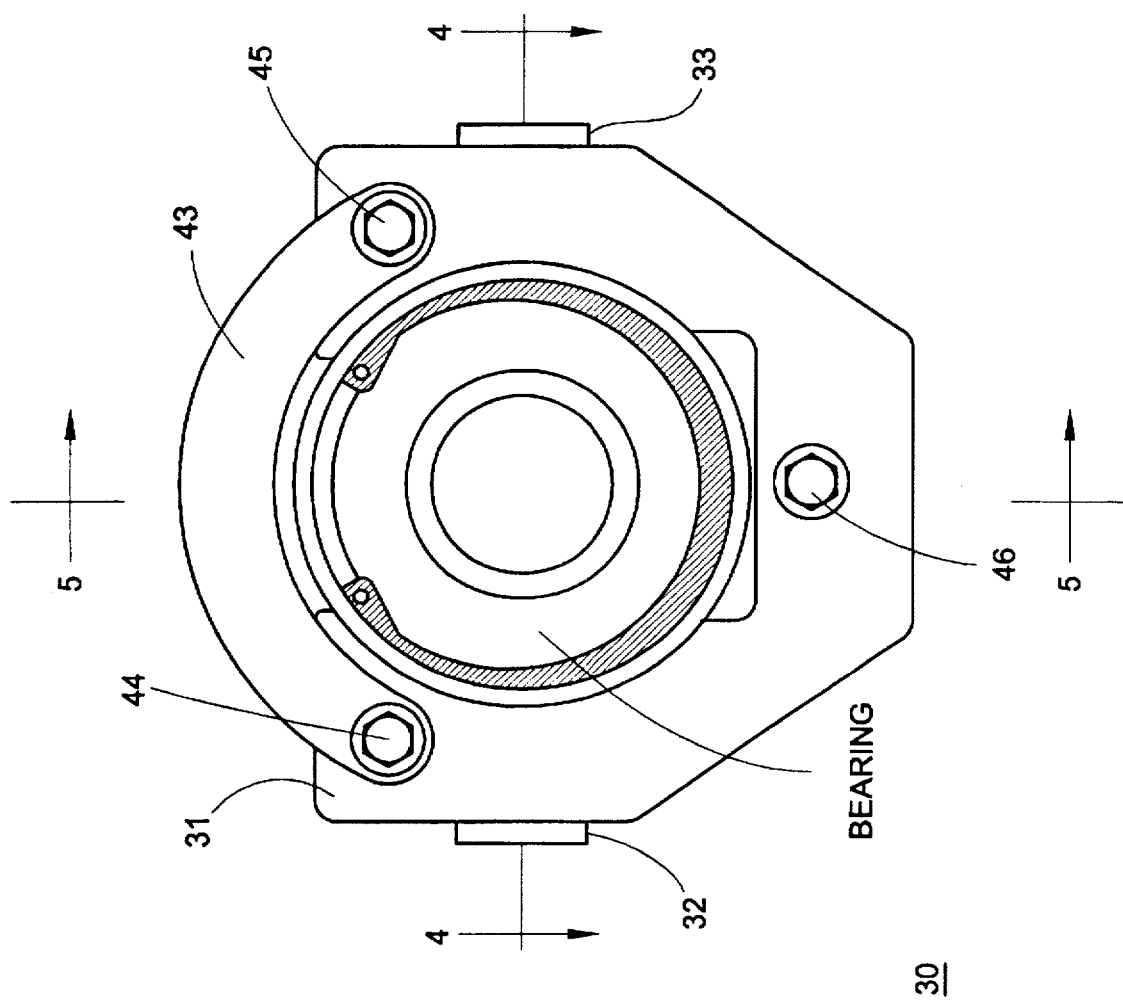
FIG. 3 shows an external elevational view of the bearing assembly of the present invention.

FIGS. 1, 2 and 2a show a type of racing kart which may use the bearing assembly of the present invention to great advantage.

The kart 10 has a lightweight, tubular chassis 12 supporting front wheel axles 13 and 14 and rear, driving axle 15.

A steering column 16 is provided with a steering wheel 17 at its upper end and is pivotally connected through a coupling assembly 18 to a pair of coupling rods 19, 20 which convert rotation of steering wheel 17 into rotation of wheels 20, 21, respectively mounted on axles 13 and 14, about a vertical axis, enabling the kart to negotiate turns and curves.

The driver's seat 23 is provided behind the steering wheel 17 including a seat and back portion. The front cross bar 12a of chassis 12 serves as a bumper or nerf bar.

An engine (not shown) is mounted adjacent to the driver's seat 23 and is coupled to the rear axle by means of a driving clutch sprocket, roller chain and driven sprocket (not shown) which is mounted on an axle hub 24 arranged to the rear of the driver's seat, as is conventional.

The rear wheels 25, 26 are respectively coupled to the left and right-hand ends of rear axle 15 and are secured to wheel hubs 15a, 15b respectively.

A bearing hanger assembly 27 is mounted to chassis 12 so as to be integral therewith and is provided with a clearance opening of sufficient inner diameter to provide a safe, spaced distance from axle 15.

Figure 4:
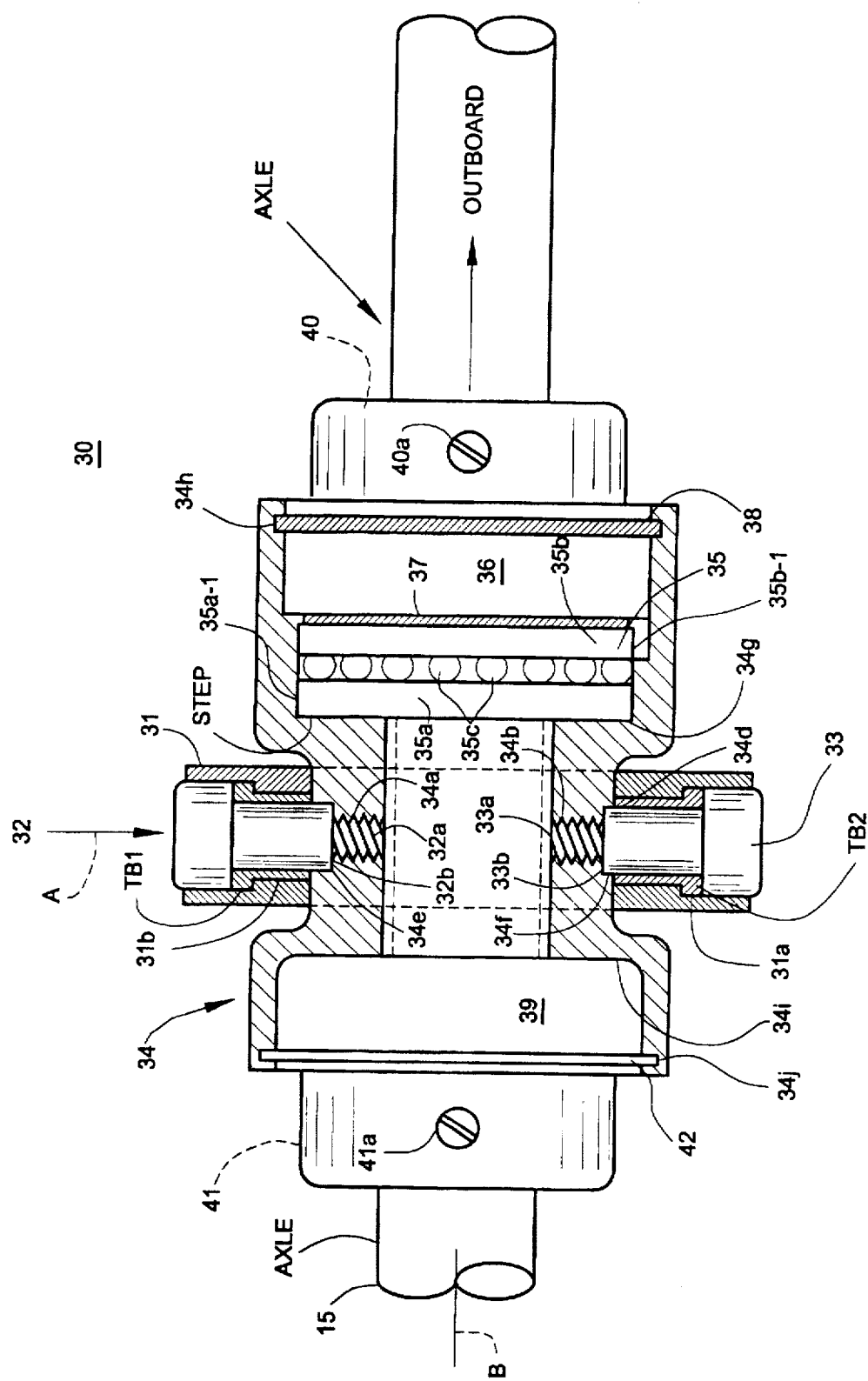
FIG. 4 is a sectional view of the bearing assembly of the present invention looking in the direction of arrows 4—4 of FIG. 3.

FIG. 4 shows us that the bearing assembly 30 of the present invention comprises a substantially U-shaped yoke 31 having a pair of openings 31a, 31b, each provided with a bushing hereinafter referred to as trunnion bushings TB1 and TB2, each receiving an associated shoulder bolt 32, 33. The shoulder bolts are each provided with threaded portions 32a, 33a which respectively threadedly engage threaded openings 34a, 34b provided in bearing assembly tubular housing 34. The outer portion of each of the threaded openings communicate with an unthreaded portion 34c, 34d of a larger diameter than the threaded portions 32a, 33a. The threaded openings are aligned to position the pivot axis of the shoulder bolts in a common plane with the longitudinal axis B of tubular housing 34 and wherein pivot axis A and longitudinal axis B are arranged at a right angle.

FIG. 4a shows an alternative arrangement to that shown in FIG. 4 wherein the mid portion of each shoulder bolt 32' and 33' is threaded to threadedly engage tapped apertures in the yoke, whereas their ends are received in bushings TB3 and TB4.

The axle 15 extends through the hollow interior of tubular housing 34. When the shoulder bolts are rotated so as to bottom out with their shoulders 32b, 33b respectively engaging shoulders 34e, 34f of tubular member 34, the shoulder bolts enable the tubular housing 34 to be pivoted about a horizontal axis A, the shoulder bolts, when bottomed out, automatically centering the pivot axis A with the longitudinal axis B of rear axle 15.

The outboard end of tubular housing 34 is provided with an annular shoulder 34g. An axial thrust bearing 35 is positioned so that its left-hand race 35a rests against shoulder 34g. The left and right-hand races 35a and 35b have sandwiched therebetween ball bearings 35c. The interior diameters 35a-1, 35b-1 of races 35a and 35b are equal and are greater than the outer diameter of axle 15 so as to be adequately spaced therefrom so that no interference occurs between the axial thrust bearing 35 and axle 15.

A radial ball bearing assembly 36 is positioned to the right of the axial thrust bearing 35 and is spaced therefrom by a thrust washer 37. An annular-shaped internal recess 34h is provided near the right-hand end of tubular housing 34 and receives a C-shaped retaining ring 38 which is snap-fitted into recess 34h, compactly retaining the bearings 35 and 36 and thrust washer within housing 34.

The left-hand end of tubular housing 34 is provided with an annular shoulder 34i. A radial ball bearing assembly 39 is positioned within tubular housing 34 and rests against shoulder 34i. A retaining ring 42 is snap-fitted within annular-shaped internal recess 34j to retain the radial ball-bearing assembly 39 in position. The ball-bearing assemblies 36 and 39 are shown in FIG. 6 and comprise inner race 36a and outer race 36b spaced apart by ball-bearings 36c. The central opening 36a-1 in inner race 36a receives axle 15.

The axle 15 is provided with a pair of locking collars 40, 41 secured to axle 15 by threaded locking members 40a, 41a.

As was mentioned hereinabove, the shoulder bolts 32 and 33, when bottomed out, automatically center the pivot axis A with the longitudinal axis, i.e., the axis of rotation, B of axle 15. Thus, when the axle experiences bending, which is especially notable when the kart maneuvers through a sharp turn, the axle and hence the bearing assembly is free to pivot about pivot axis A enabling the bearing assembly to rotate about the horizontal axis during flexing of the chassis, allowing the bearings within tubular housing 34 to operate independent of chassis movement, thereby assuring free rotation thereof.

Bearings 36 and 39 take up radial thrust and stabilize the axle by providing two points of axle contact which are spaced apart as opposed to an axle which is supported at one point by a conventional single bearing. Two bearings reduce the flexing of the axle. In one preferred embodiment the vertical centerlines of the bearings 36, 39 are spaced apart by a distance of the order of four (4) inches.

When a kart goes through a turn, the chassis is forced to slide outward along the axle. However, the inner race 36a of radial bearing 36 presses against locking collar 40, which is at the outboard end of axle 15. This force is transferred to the right-hand face of the axial thrust bearing 35 which takes up the lateral load.

Making reference to the problem recognized in karts employing conventional bearing assemblies, videotapes taken of karts employing both conventional bearings and the bearing assembly of the present invention, it has been noted that karts employing conventional bearings slow down over a space of three to four feet or less in the range where the maximum cornering loads occurs just after the apex (on a level track). At this location, karts having the bearing assemblies of the present invention appear to lunge ahead a kart length or so. Karts having conventional bearings had been found to slow down at this spot. In testing a kart employing the novel bearing assembly of the present invention on a counterclockwise oval track, a right rear corner of the kart was preloaded so as to carry 40 pounds more than the left rear and was found that no chassis bind occurred. Karts are typically preloaded on the left rear corner in another example (i.e. the distribution of weight is such that a greater amount of weight is concentrated in the left rear of the kart), to relieve chassis bind.

The configuration of the bearing assembly of the present invention allows the bearing assembly to be retrofitted to virtually every race kart made including chassis back to the early 1960s.

In order to enhance the safety of the bearing assembly 30, a safety bail 43 is positioned to bridge the open end of yoke 31 and is secured to yoke 31 by threaded fastening members 44 and 45 which together with fastening member 46 further serve as the means for securing yoke 31 and hence the bearing assembly 30 to bearing hanger 27.

Figure 8:
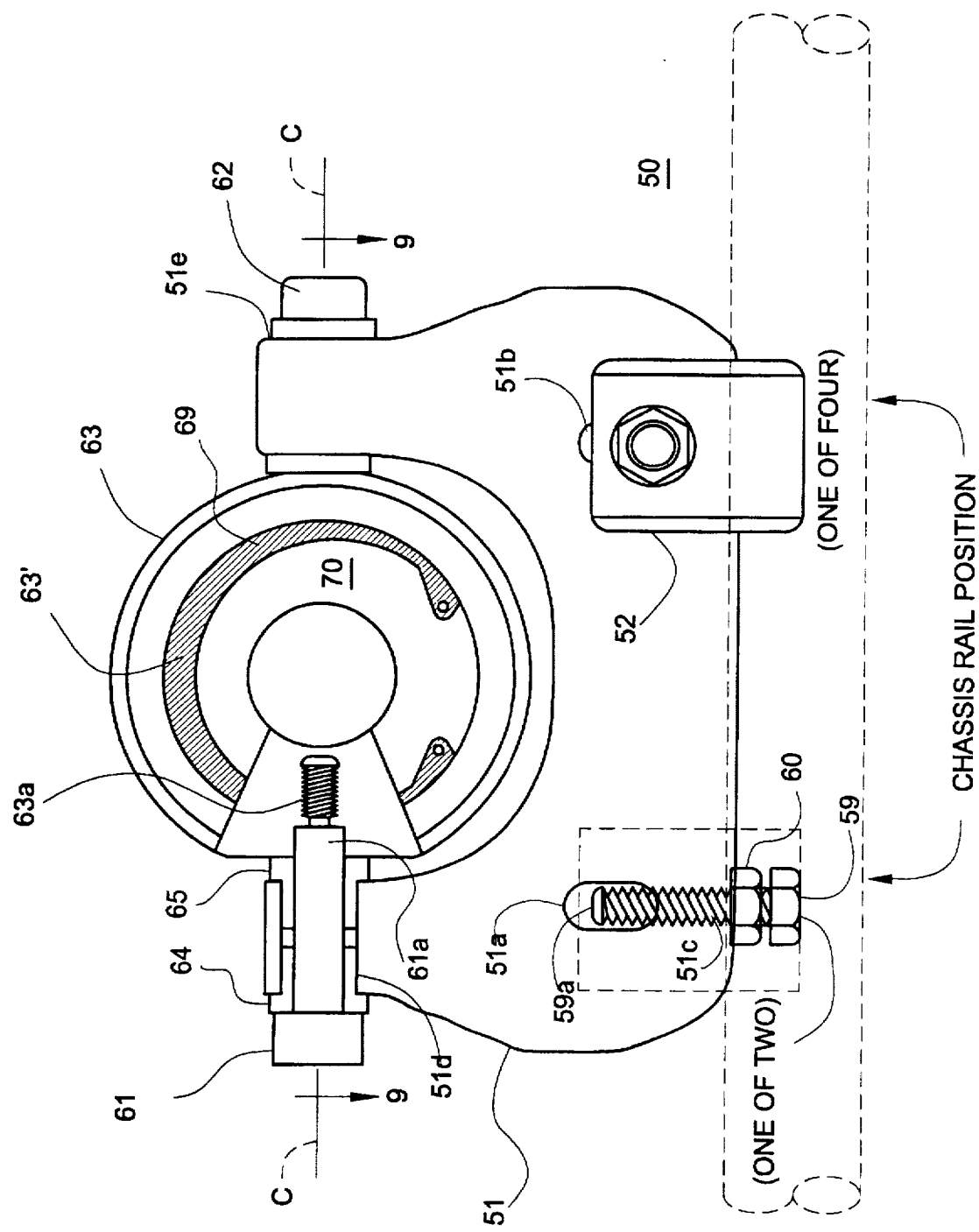
FIGS. 8 and 9 are views of another alternative embodiment of the present invention, FIG. 8 showing an elevational view of the second embodiment partially sectionalized and looking in the direction of arrows 8—8 of FIG. 9.
Figure 9:
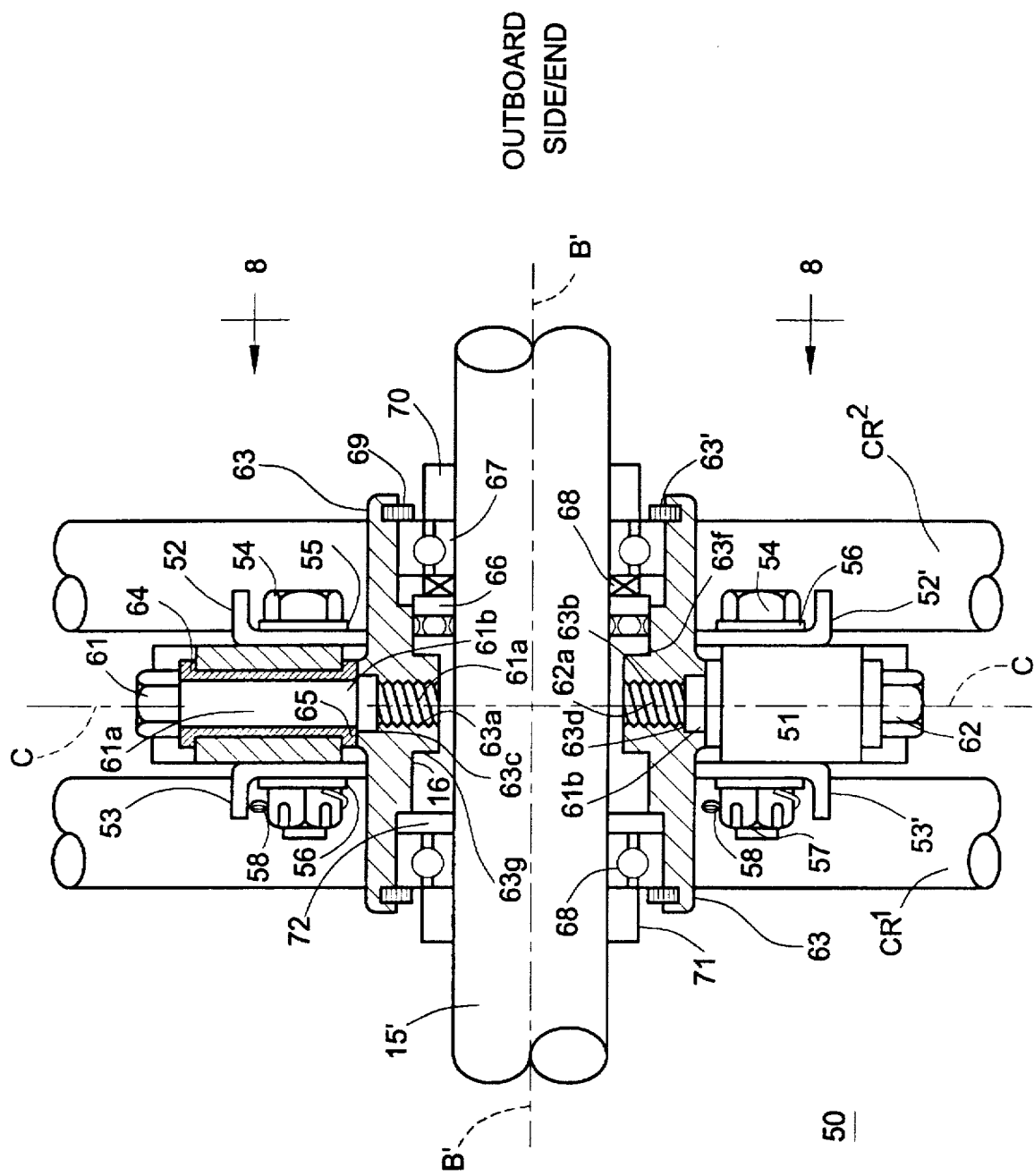

An alternative embodiment 50 of the present invention is shown in FIGS. 8 and 9 and, although somewhat different in configuration, includes substantially the same components employed in the first embodiment 30.

Second embodiment 50 is comprised of a yoke 51 which is mounted upon a dual rail support comprising a pair of chassis rails CR1 and CR2.

Yoke 51 is provided with a pair of elongated openings 51a, 51b. A pair of chassis mount brackets, 52–53 are arranged on opposite sides of yoke 51 and are secured to yoke 51 by mounting fastener assemblies comprising a bolt 54, flat washers 55 and 56, a castellated nut 57 and a cotter pin 58. The height of the chassis mount brackets 52, 53 are each capable of being adjusted by means of a jacking bolt 59, only one of which is shown in FIG. 8 for purposes of simplicity, which threadedly engages threaded opening 51c in yoke 51. The upper end 59a of jacking bolt 59 engages a central portion of bolt 54 thereby adjusting the height of the mounting brackets 52, 53 (hence, chassis ride height) relative to the yoke 51. When the desired adjustment is obtained, a lock nut 60 is tightened to retain the desired position.

A similar pair of chassis mount brackets $52^1$, $53^1$ are likewise arranged in the manner shown in FIG. 9 and all four brackets are adjusted relative to yoke 51. The four brackets are welded or otherwise secured to the chassis rails CR1 and CR2. The jacking bolts 59, in addition to adjusting the height of brackets 52, 53 and $52^1$, $53^1$ further are adjustable to assure that the longitudinal axis C of the trunnion assembly of embodiment 50 is horizontally aligned.

Yoke 51 is provided with a pair of coaxially aligned openings for receiving shoulder bolts 61, 62 which are similar in nature to the shoulder bolts 32 and 33 of embodiment 30. Each of the shoulder bolts has a threaded portion 61a, 62a which threadedly engages tapped openings 63a, 63b provided in tubular housing 63.

The openings 51d, 51e in yoke 51 are each provided with a pair of trunnion bushings such as the trunnion bushings 64, 65 which slideably engage the cylindrical-shaped body portion 61a of shoulder bolt 61. Each of the shoulder bolts, when their shoulders 61b, 62b bottom out against cooperating shoulders 63c, 63d, automatically align the pivot axis of the trunnion assembly, comprising shoulder bolts 61 and 62 to align the pivot axis of the trunnion mount so that it intersects with the longitudinal axis $B^1$ of axle $15^1$ and lies in a common plane therewith (i.e., the end adjacent to the extrados of the turn).

The outboard end of the tubular bearing housing 63 is provided with a thrust bearing 66 and a radial bearing 67 similar in design and function to the thrust bearing 35 and radial bearing 36 shown in FIG. 4. A thrust washer 68 is positioned between bearings 66 and 67, similar to the thrust washer 37 of FIG. 4. A retaining ring 69 snap-fitted into recess 63' to compactly retain the bearings 66 and 67 and the thrust washer 68 within tubular housing 63. An outer locking collar 70 similar to the outboard locking collar 40 shown in FIG. 4 is pressed against the inner race of radial bearing 67.

A radial bearing 68 is arranged at the inboard end of bearing housing 63, similar to the bearing 39 shown in FIG. 4. An inner locking collar 71 is secured to axle $15^1$ and bears against the inner race of radial bearing 68.

Axial thrust bearing 66 rests against an annular-shaped shoulder 63f in tubular housing 63. A similar annular shoulder 63g is provided to limit the position of a second axial thrust bearing which may be placed between radial bearing 68 and shoulder 63g, together with an additional thrust washer, similar to thrust washer 68. In embodiments in which the additional axial thrust bearing and thrust washer are omitted, a suitable spacer 72 is provided to maintain the tight, compact fit for radial bearing 68. The axial thrust bearing and thrust washer in the right-hand side of tubular housing 63 may be omitted and placed in the left-hand side thereof when the outboard end of the kart lies to the left.

As was pointed out hereinabove, the inner diameters of the axial thrust bearing are greater than the outer diameter of axle 15[1] to provide sufficient clearance therebetween and thus assure free rotation of the axle. The second embodiment provides the same functions and advantages of embodiment 30.

In addition, the embodiment 30 may be modified so as to include an additional axial thrust bearing and axial thrust washer thereby enabling both embodiments 30 and 60 to provide bearing assemblies which substantially eliminate chassis bind when operating a kart having the bearing assemblies of the present invention through both left and right-hand turns.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A bearing assembly for stably supporting a drive axle comprising:
   a mounting yoke;
   a bearing assembly housing;
   said yoke pivotally supporting said housing about a pivot axis which is aligned transverse to a longitudinal axis of rotation of said axle;
   said pivot axis being intermediate opposite ends of said housing; and
   bearings mounted in said housing on opposite sides of said pivot axis for rotatably supporting said axle while reducing flexing thereof.

2. The bearing assembly of claim 1 wherein said bearings include bearings for taking up radial loading of said axle.

3. The bearing assembly of claim 1 further comprising at least one axial thrust bearing for taking up an axial loading of said axle.

4. The bearing assembly of claim 1 further comprising first and second axial thrust bearings for taking up axial loading of said axle.

5. The bearing assembly of claim 1 wherein said bearings comprise radial bearings arranged on opposite sides of said pivot axis.

6. The bearing assembly of claim 5 further comprises an axial thrust bearing mounted adjacent to one of said radial bearings for taking up axial loading of said axle.

7. The bearing assembly of claim 5 further comprises axial thrust bearings being mounted adjacent to one of said radial bearings for taking up axial loading of said axle.

8. The bearing assembly of claim 1 wherein said pivot support of said housing comprises a pair of pins secured to opposite sides of said housing and extending through openings in said yoke, said pins having longitudinal axes coincident with said pivot axis.

9. The bearing assembly of claim 1 wherein the axis of rotation of said axle and said pivot axis lie in a common plane and intersect one another at a right angle.

10. The bearing assembly of claim 1 wherein the pivot axis is above the axis of rotation of said axle.

11. The bearing assembly of claim 1 wherein the pivot axis is below the axis of rotation of said axle.

12. The bearing assembly of claim 1 wherein said housing is a tubular housing having an annular recess about its periphery;
   a pair of openings being provided in said recess and lying along and at opposite ends of a common diameter for aligning pivot pins mounted in said openings with a longitudinal central axis of said housing.

13. The bearing assembly of claim 12 wherein said housing is provided with an annular internal shoulder positioned to one side of said pivot annular axis;
   an axial thrust bearing positioned against said annular shoulder;
   a radial bearing positioned against said thrust bearing; and
   a retaining member map-filled within an internal recess in one end of said housing for retaining said thrust bearing and said radial bearing in said housing.

14. The bearing assembly of claim 13 wherein the thrust bearing has a central opening with an inner diameter greater than an outer diameter of said axle to prevent said thrust bearing from interfering with rotation of said axle.

15. The bearing assembly of claim 13 wherein the radial bearing has an inner race with a central opening receiving said axle and an outer race supported by said housing.

16. The bearing assembly of claim 15 further comprising a locking collar secured to said axle and engaging the inner race of said radial bearing whereby the thrust bearing takes up axial loading due to forces urging said bearing assembly toward said locking collar.

17. The bearing assembly of claim 1 further comprises mounting brackets on said yoke for mounting and yoke upon a support, said mounting brackets including means for aligning the pivot axis at a desired orientation.

18. The bearing assembly of claim 1 wherein said housing is a tubular housing having an annular recess about its periphery;
   a pair of openings being provided in said recess and lying along a line a spaced parallel distance from a horizontally aligned diameter of said housing.

19. The bearing assembly of claim 1 wherein said yoke is a substantially U-shaped member,
   a safety bail secured to said yoke on opposing sides of said opening and cooperating with said yoke to encircle said housing.

20. A bearing assembly mounted upon a chassis rotatably supporting an axle comprising:
   a mounting yoke;
   a bearing assembly housing;
   said yoke pivotally supporting said housing about a pivot axis which intersects a longitudinal axis of rotation of said axle;
   said pivot axis being intermediate opposite ends of said housing; and
   bearings mounted in said housing on opposite sides of said pivot axis rotatably supporting said axle.

21. The bearing assembly of claim 20 wherein said bearings are spaced apart a given distance.

22. The bearing assembly of claim 21 wherein said given distance is of the order of four (4) inches.

* * * * *